(12) United States Patent
Fredriksson et al.

(10) Patent No.: US 9,145,079 B2
(45) Date of Patent: Sep. 29, 2015

(54) VEHICLE HEAD RESTRAINT WITH ELECTROMAGNETIC LATCH RELEASE

(71) Applicant: WINDSOR MACHINE AND STAMPING 2009 LTD., Windsor (CA)

(72) Inventors: Christopher James Fredriksson, LaSalle (CA); Eleazar Felipe Bustamante, Waterloo (CA)

(73) Assignee: WINDSOR MACHINE AND STAMPING 2009 LTD. (CA)

( * ) Notice: Subject to any disclaimer, the term of this patent is extended or adjusted under 35 U.S.C. 154(b) by 0 days.

(21) Appl. No.: 14/212,127

(22) Filed: Mar. 14, 2014

(65) Prior Publication Data

US 2014/0265507 A1 Sep. 18, 2014

Related U.S. Application Data

(60) Provisional application No. 61/782,808, filed on Mar. 14, 2013.

(51) Int. Cl.
*B60N 2/42* (2006.01)
*B60R 21/00* (2006.01)
(Continued)

(52) U.S. Cl.
CPC .............. *B60N 2/4841* (2013.01); *B60N 2/002* (2013.01); *B60N 2/487* (2013.01); *B60N 2/4844* (2013.01); *B60N 2/4855* (2013.01); *B60N 2/4858* (2013.01); *B60N 2/4873* (2013.01); *B60N 2/4279* (2013.01); *B60N 2/48* (2013.01); *B60N 2/4805* (2013.01); *B60N 2/4823* (2013.01)

(58) Field of Classification Search
CPC ...... B60N 2/4805; B60N 2/48; B60N 2/4811; B60N 2/4823; B60N 2/4279

USPC ............ 297/408, 391, 409, 407, 404, 216.12, 297/217.3; 701/49
See application file for complete search history.

(56) References Cited

U.S. PATENT DOCUMENTS 6,688,697 B2 * 2/2004 Baumann et al. ............. 297/391
7,108,320 B2 * 9/2006 Schafer et al. ........... 297/216.12
(Continued)

FOREIGN PATENT DOCUMENTS

DE 102005051109 A1 4/2007
DE 102006027646 A1 12/2007
DE 102012214948 A1 2/2013

OTHER PUBLICATIONS

Search Report regarding related EP App. No. 14159218.8-1758; dated Apr. 28, 2014; 7 pages.

*Primary Examiner* — Chi Q Nguyen
(74) *Attorney, Agent, or Firm* — Cantor Colburn LLP

(57) ABSTRACT

A head restraint assembly includes a locking mechanism that is electromagnetically actuated and is selectively moveable between a locked and an unlocked position, thereby allowing the head restraint to move between an upright and a folded position. The locked position comprises engagement of a first lock member with a second lock member to prevent rotation of the head restraint relative to a base portion of the head restraint and the unlocked position comprises disengagement of the first lock member from the second lock member to allow rotation of the head restraint relative to the base portion. An electromagnet is operatively connected to the head restraint and positioned to exert a magnetic force on the second lock member that urges the second lock member toward the unlocked position when the electromagnet is in an energized condition.

20 Claims, 7 Drawing Sheets

(51) Int. Cl.
   *B60N 2/48* (2006.01)
   *B60N 2/00* (2006.01)
   *B60N 2/427* (2006.01)

(56) References Cited

U.S. PATENT DOCUMENTS

| | | | |
|---|---|---|---|
| 7,293,829 B2 * | 11/2007 | Thiel et al. | 297/216.12 |
| 7,350,859 B2 * | 4/2008 | Klukowski | 297/216.12 |
| 7,484,796 B2 * | 2/2009 | Fischer et al. | 297/216.12 |
| 7,871,129 B2 * | 1/2011 | Boes et al. | 297/404 |
| 7,895,722 B2 * | 3/2011 | Bohmer et al. | 29/91.1 |
| 8,936,311 B2 * | 1/2015 | Corral Rodriguez et al. | 297/216.12 |
| 8,939,512 B2 * | 1/2015 | Boes et al. | 297/408 |
| 2007/0284929 A1 | 12/2007 | Keller et al. | |
| 2013/0049429 A1 | 2/2013 | Yetukuri et al. | |

* cited by examiner

VEHICLE HEAD RESTRAINT WITH ELECTROMAGNETIC LATCH RELEASE

CROSS-REFERENCE TO RELATED APPLICATION

This patent application claims priority to U.S. Provisional Application No. 61/782,808, filed Mar. 14, 2013, which is incorporated herein by reference in its entirety.

FIELD OF THE INVENTION

The subject matter disclosed herein relates to vehicle head restraints and, more particularly, to a vehicle head restraint with an electromagnetic release mechanism.

BACKGROUND OF THE INVENTION

Many vehicles, such as automobiles, include a headrest or head restraint atop an occupant's seatback and in a position adjacent the occupant's head. Head restraints are typically cushioned for comfort, are height adjustable, and most are commonly finished in the same material as the rest of the seat. Although head restraints provide desirable functionalities related to comfort and safety, the upward protrusion of the head restraints may partially obstruct sightlines for occupants of the vehicle. For example, head restraints associated with rear seats may reduce visibility for a driver during rearward movement of the vehicle. Such a situation is undesirable for a driver. As noted above, some head restraints are adjustable (e.g., rotatable, translatable) and/or removable, but the adjustments typically require a manual interaction with the head restraint. The adjustments may be cumbersome or impossible for a seated driver to perform. These are just a few drawbacks associated with current head restraints.

BRIEF DESCRIPTION OF THE INVENTION

According to one aspect of the invention, a head restraint assembly includes a base portion mountable to a vehicle seat. Also included is a head restraint operatively coupled to the base portion and selectively rotatable with respect to the base portion about a first axis for movement between an upright position and a folded position. Further included is a locking mechanism including a first lock member mounted with respect to the base portion and a second lock member rotatably mounted with respect to the head restraint for movement between a locked position and an unlocked position, wherein the locked position comprises engagement of the first lock member with the second lock member to prevent rotation of the head restraint relative to the base portion, and wherein the unlocked position comprises disengagement of the first lock member from the second lock member to allow rotation of the head restraint relative to the base portion. Yet further included is an electromagnet operatively connected to the head restraint and positioned to exert a magnetic force on the second lock member that urges the second lock member toward the unlocked position when the electromagnet is in an energized condition.

According to another aspect of the invention, a locking mechanism disposed within an interior portion of a head restraint includes a first lock member mounted within the head restraint. Also included is a second lock member mounted within the head restraint and rotatable about an axis between a locked position and an unlocked position, wherein the locked position comprises engagement of the first lock member with the second lock member to prevent rotation of the head restraint relative to the base portion, and wherein the unlocked position comprises disengagement of the first lock member from the second lock member to allow rotation of the head restraint relative to the base portion. Further included is a groove defined by the second lock member and a protuberance defined by the first lock member. Yet further included is a first stop surface and a second stop surface disposed within the groove, wherein the protuberance of the first member is inside the groove and simultaneously contacts both the first stop surface and the second stop surface when the second lock member is in the locked position, wherein the protuberance of the first member is externally located relative to the groove when the second lock member is in the unlocked position. Also included is an electromagnet mounted within the head restraint and positioned to exert a magnetic force on the second lock member that urges the second lock member toward the unlocked position when the electromagnet is in an energized condition, wherein the second lock member includes first and second protuberances that align with respective segments of the electromagnet when the second lock member is in the unlocked position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
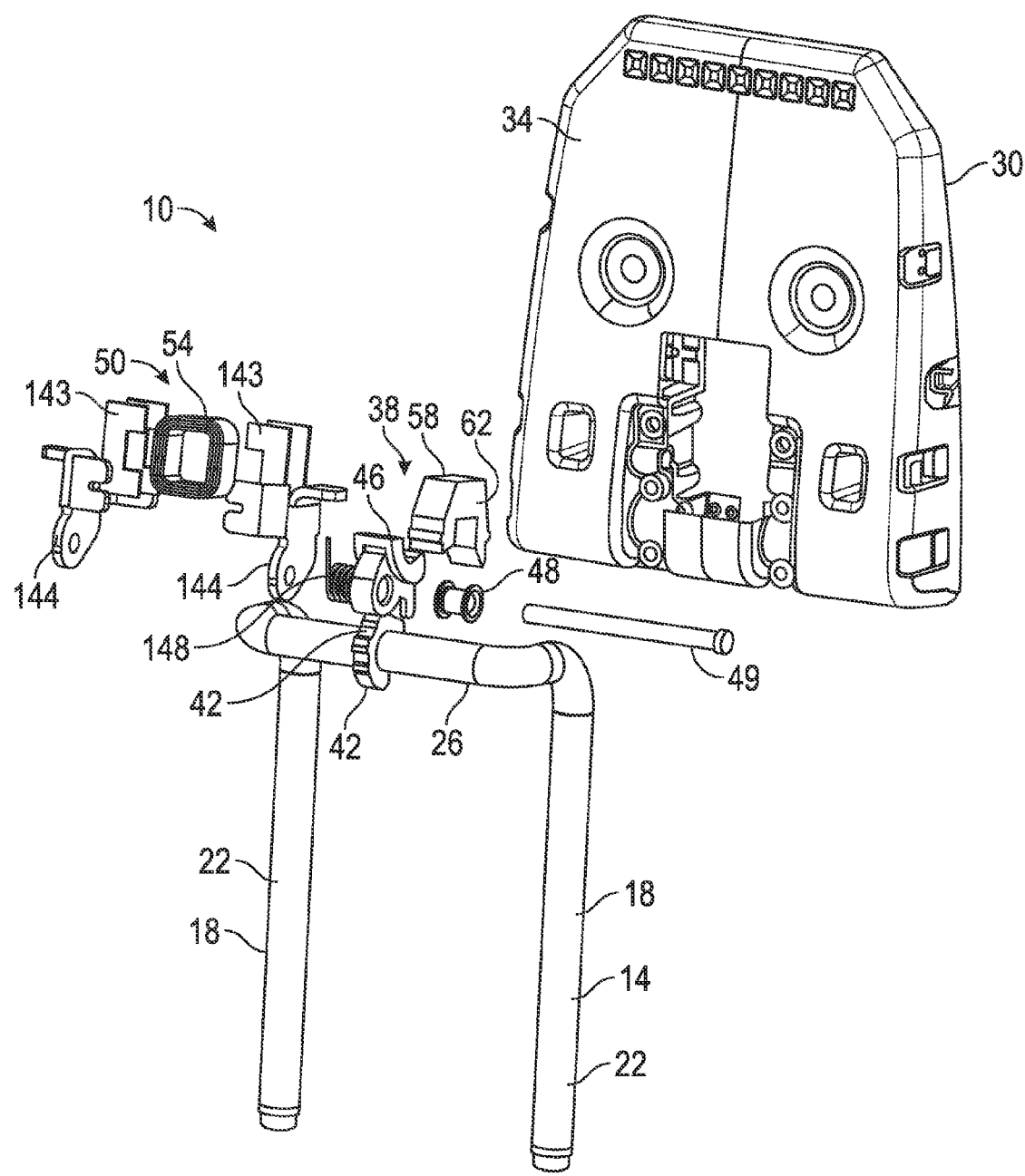
FIG. 1 is a perspective, disassembled view of a head restraint assembly.
Figure 2:
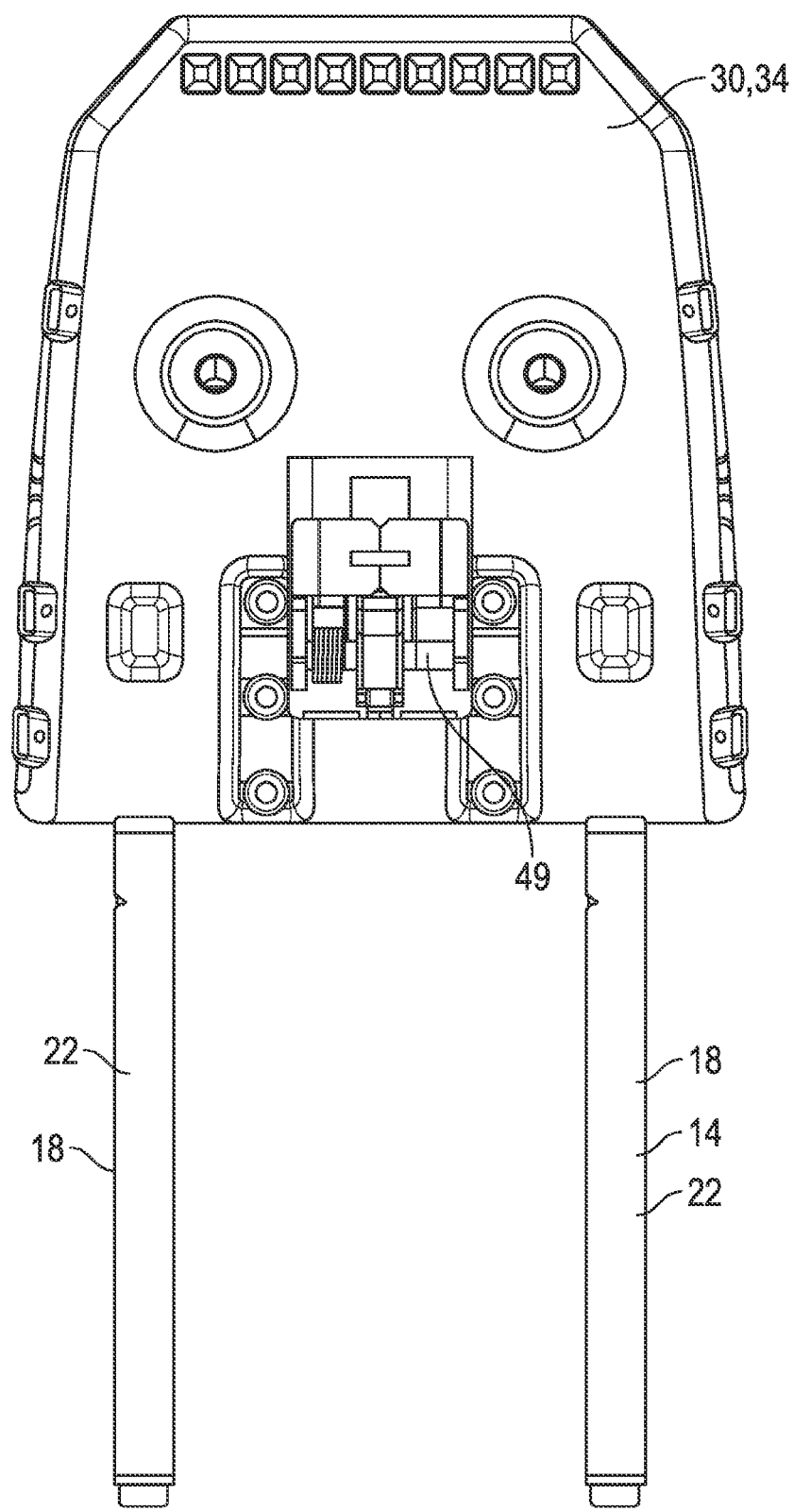
FIG. 2 is a front elevational view of the head restraint assembly.
Figure 3:
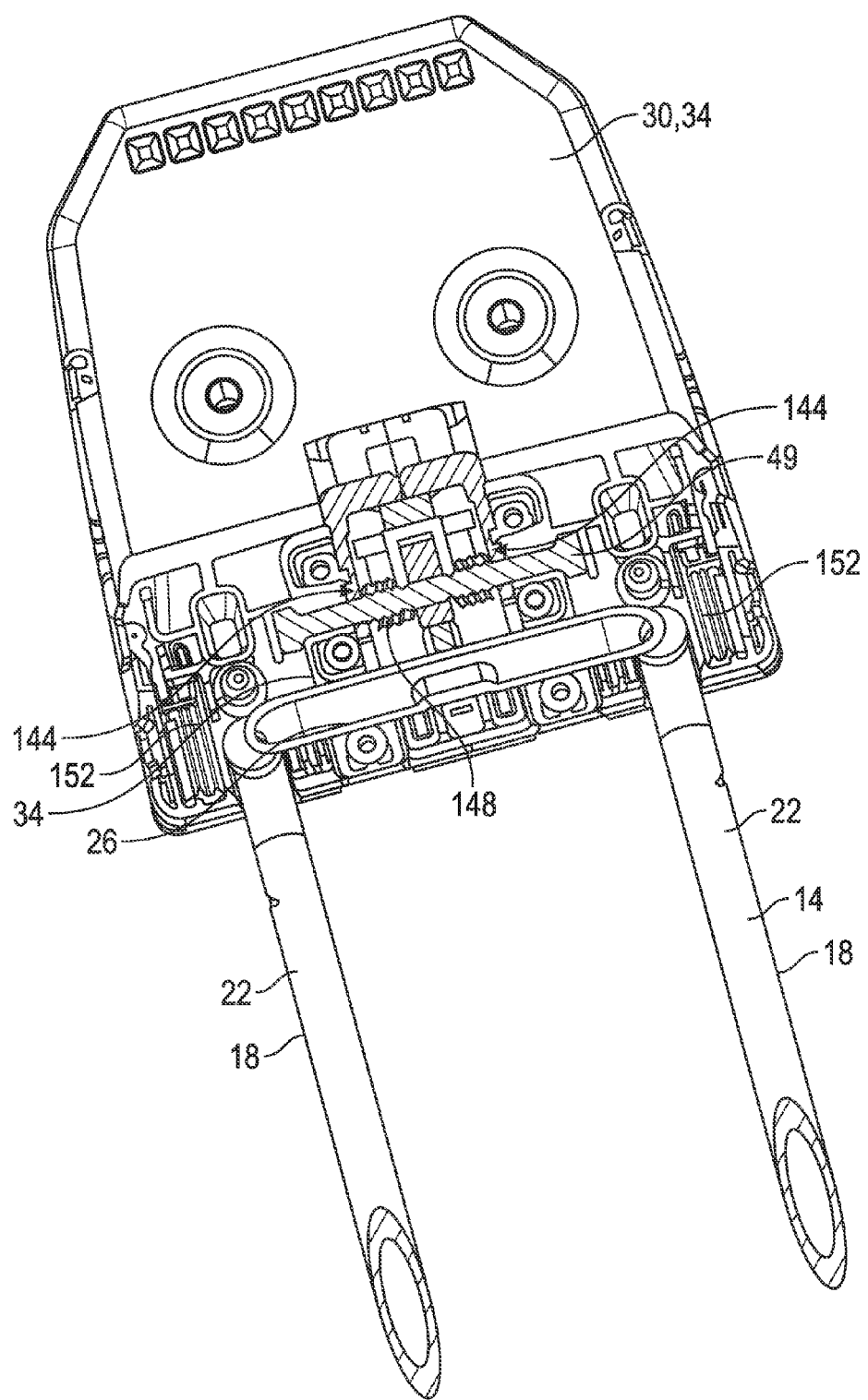
FIG. 3 is a schematic, partial cut-away view of the head restraint assembly.

The detailed description explains embodiments of the invention, together with advantages and features, by way of example with reference to the drawings.

DETAILED DESCRIPTION OF THE INVENTION

Referring to the Figures, a head restraint assembly 10 is schematically depicted. The head restraint assembly 10 includes a base portion 14 that is mountable to a vehicle seat (not illustrated), and, more specifically, to the upper portion of the seatback of the vehicle seat. In the embodiment depicted, the base portion 14 includes two post members 18 that are mounted, or mountable, to the top of the seatback of the vehicle seat, as understood by those skilled in the art. Each of the post members 18 includes a respective elongated, straight portion 22. Each of the straight portions 22 extends into a respective hole formed in the top of the seatback to attach the head restraint assembly 10 to the vehicle seat. The base portion 14 also includes a cross-member 26 that interconnects the two post members 18.

The head restraint assembly 10 further includes a head restraint 30 mounted with respect to the base portion 14. In the embodiment depicted, the head restraint 30 includes a plastic frame 34 that provides rigid structure to the head restraint 30. The head restraint 30 also includes cushion (not shown) and a head restraint cover (not shown) that are mounted with respect to the frame 34 for movement therewith. The head restraint cushion is comprised of a soft foam material or a like material to provide a cushion between the head of a human occupant of the vehicle seat and the head restraint frame 34. The head restraint cover covers at least part of the cushion and the frame to enhance the aesthetics of the head restraint. Exemplary cover materials include cloth, vinyl, leather, etc. Other frame configurations may be employed within the scope of the claimed invention.

Figure 4:
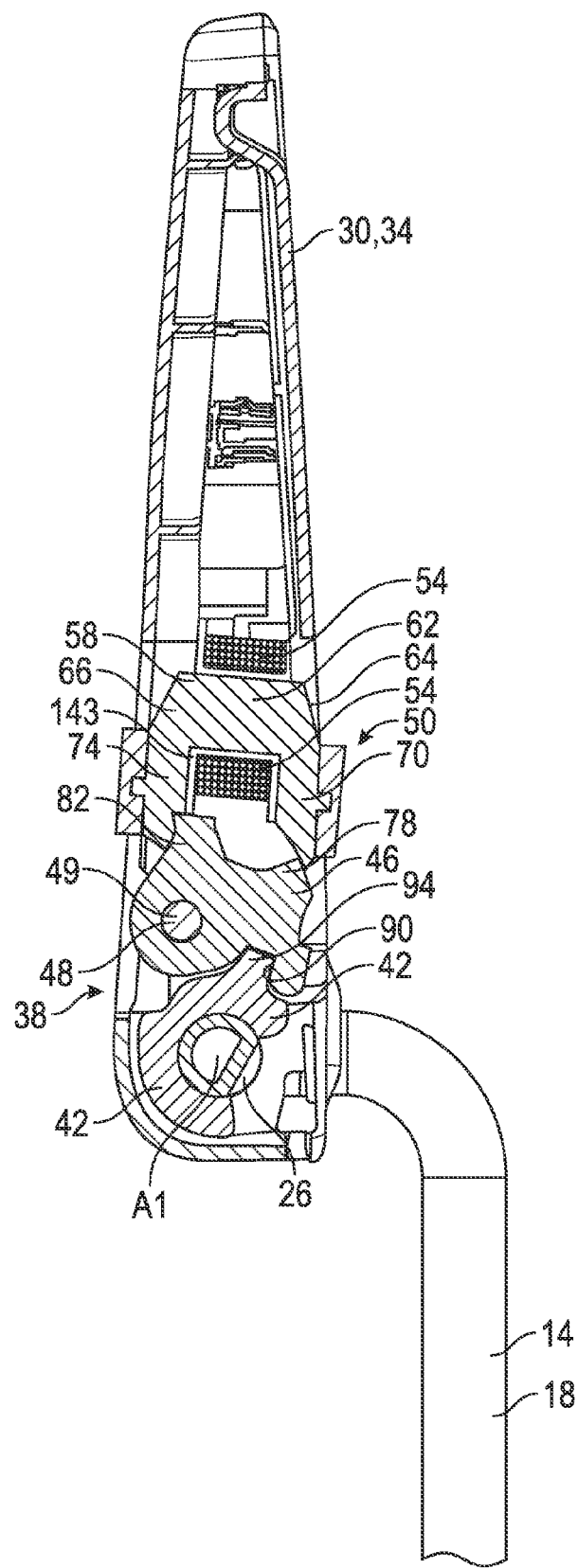
FIG. 4 is a side, cross-sectional view of the head restraint assembly in an upright, locked position.
Figure 5:
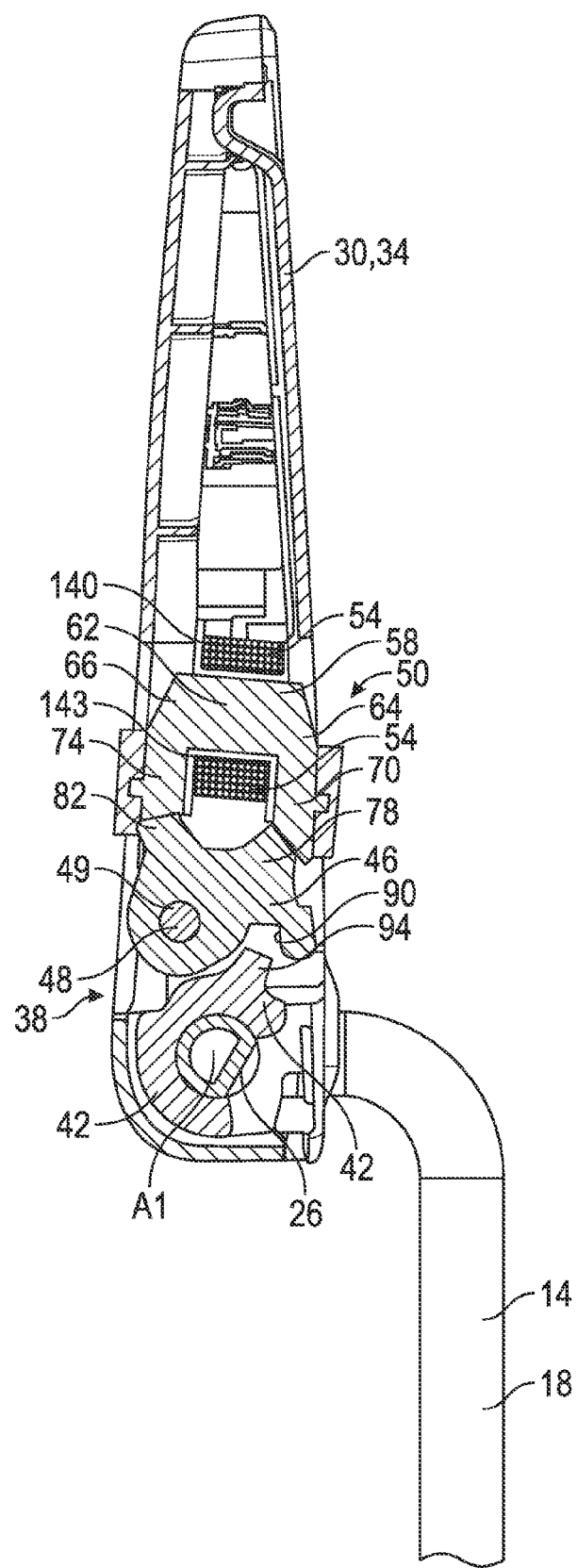
FIG. 5 is a side, cross-sectional view of the head restraint assembly in an upright, unlocked position.
Figure 6:
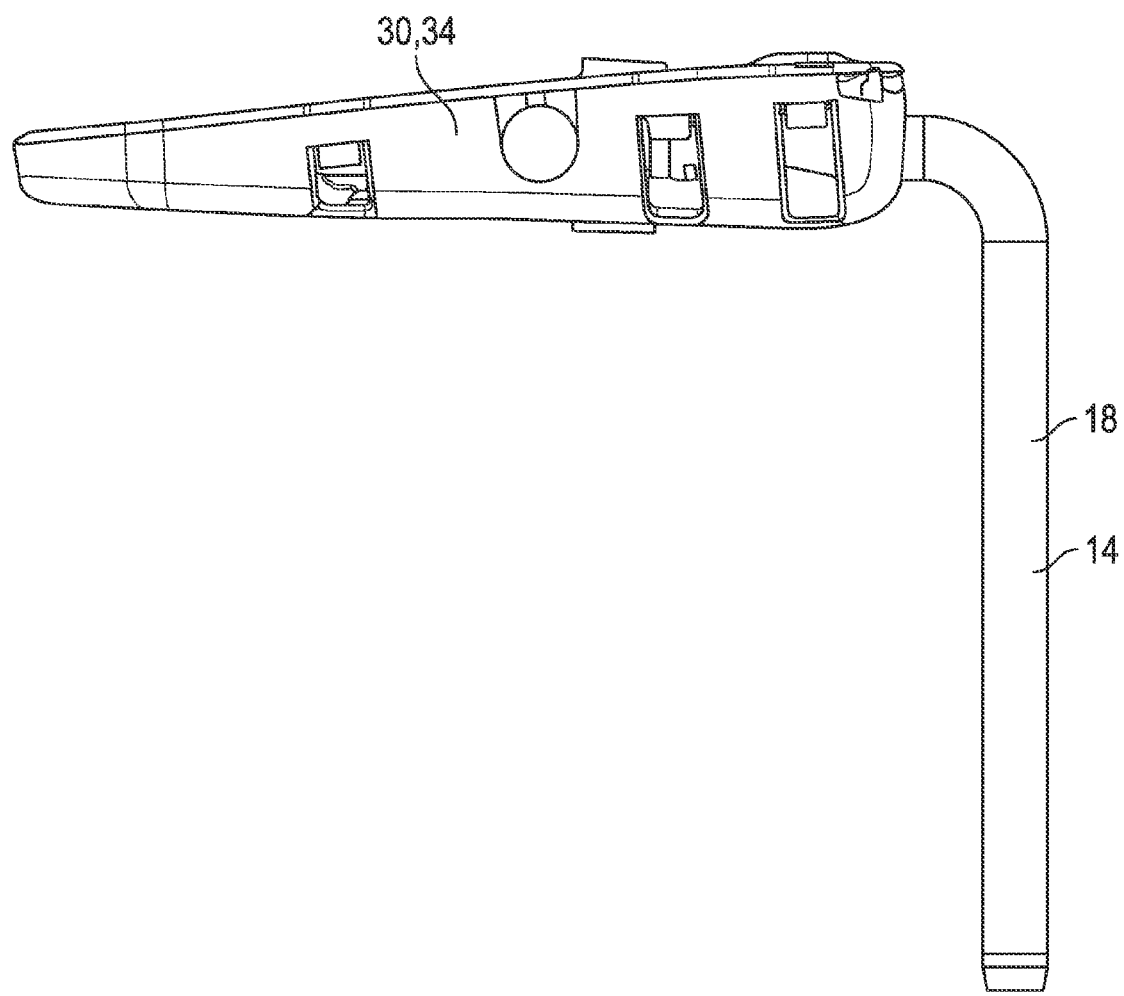
FIG. 6 is a side view of the head restraint assembly in a folded position.

The frame 34 is rotatably mounted with respect to the base portion 14 such that the frame 34 (and the rest of the head restraint 30, including the cushion and cover) is selectively rotatable with respect to the base portion 14 about a first axis A1, and, therefore, is also selectively rotatable with respect to the seatback portion of the vehicle seat. More specifically, the head restraint 30 is mounted with respect to the base portion 14 and selectively rotatable with respect to the base portion 14 about a first axis A1 for movement between an upright position (FIGS. 2-5) and a folded position (FIG. 6).

A locking mechanism 38 includes a first lock member 42 mounted with respect to the base portion 14 and, more specifically, mounted to the cross-member 26. The locking mechanism 38 also includes a second lock member 46 rotatably mounted with respect to the head restraint frame 34 for movement between a locked position (FIG. 4) and an unlocked position (FIG. 5). Bushing 48 extends through a hole in the second lock member 46 to rotatably support the second lock member 46; the second lock member 46 is rotatable about a second axis A2 (FIG. 7) between the locked and unlocked positions; the axis A2 is coextensive with the bushing 48. A rod 49 extends through a hole in the bushing 48 to support the bushing 48 relative to the frame 34.

The Figures illustrate an aperture in the head restraint assembly 10 that corresponds to a general location in which the locking mechanism 38 is located. It is to be appreciated that a cover layer of plastic or the like is disposed over the aperture to enclose the locking mechanism 38 within the head restraint assembly 10.

When the second lock member 46 is in the locked position, it is engaged with the first lock member 42 such that the interaction of the first and second lock members 42, 46 prevents rotation of the head restraint 30 relative to the base portion 14. When the second lock member 46 is in the unlocked position, it is disengaged from the first lock member 42 such that the first and second lock members do not restrict rotation of the head restraint 30 relative to the base portion 14.

An electromagnet 50 is operatively connected to the head restraint 30 and positioned such that, when the electromagnet 50 is energized, the electromagnet 50 exerts a magnetic force on the second lock member 46 that urges the second lock member 46 toward the unlocked position. The electromagnet 50 includes a copper wire coil 54 around a ferromagnetic core 58. The core 58 is generally U-shaped, with a first segment 62 extending through the coil 54 and having opposite ends 64, 66. The core 58 also includes second and third segments 70, 74 extending from a respective one of the ends 64, 66 of the first segment 62 toward the second lock member 46.

The second lock member 46 includes first and second protuberances 78, 82 that align with the second and third segments 70, 74, respectively, of the core 58 when the second lock member 46 is in the unlocked position. More specifically, when the second lock member 46 is in the locked position (FIG. 4), the protuberances 78, 82 are not aligned with segments 70, 74, respectively. When the electromagnet 50 is energized, i.e., when electrical current flows through the coil 54, the electromagnet exerts a magnetic force on the second member 46 that draws the protuberances 78, 82 adjacent to, and into alignment with, the segments 70, 74, thereby rotating the second lock member 46 into the unlocked position (FIG. 5).

Figure 7:
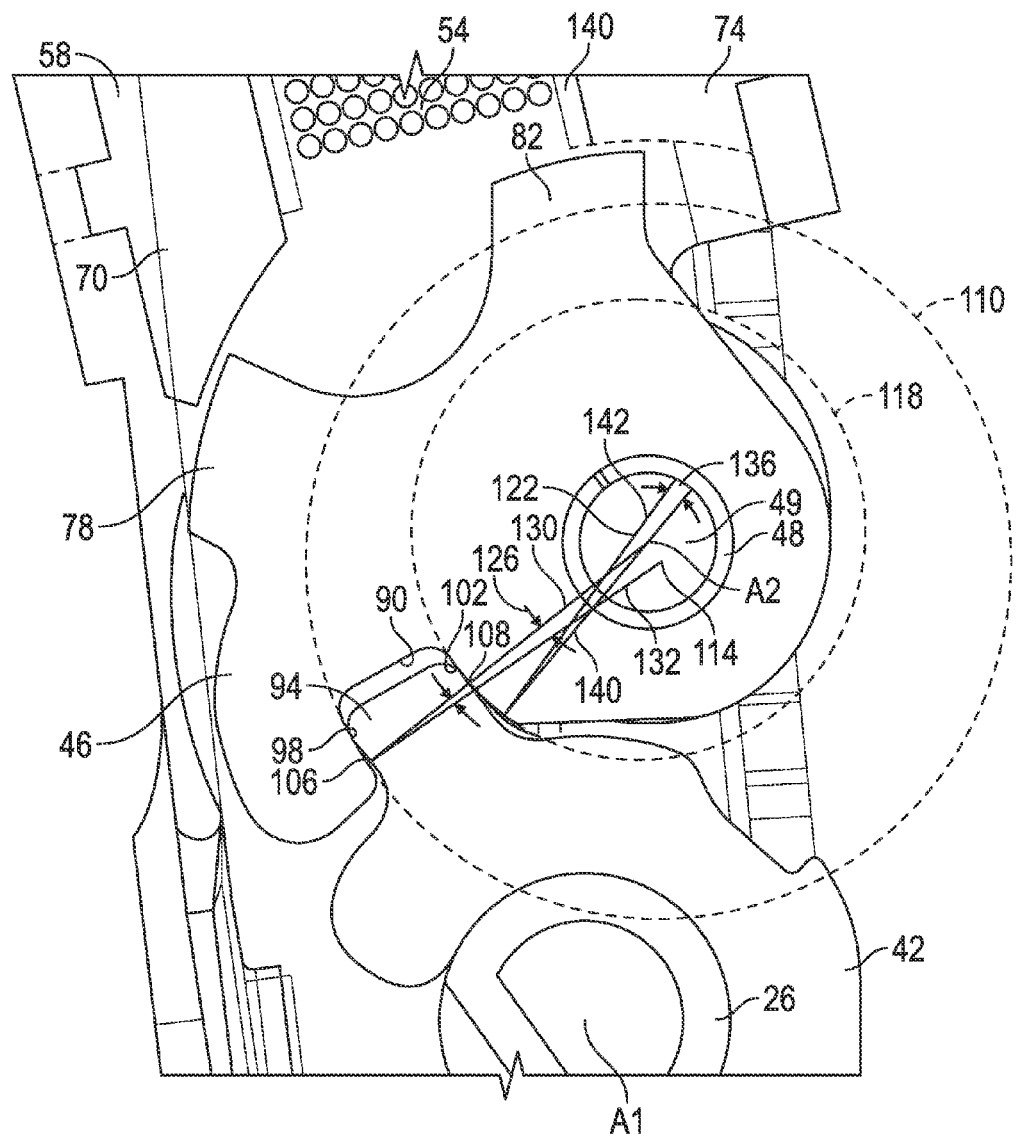
FIG. 7 is a schematic, cross-sectional, side view of a locking mechanism of the head restraint assembly.

The second lock member 46 defines a groove 90, and the first lock member 42 defines a protuberance 94. Referring specifically to FIG. 7, the groove 90 includes a first stop surface 98 and a second stop surface 102. The protuberance 94 of the first lock member 42 is inside the groove 90 and simultaneously contacts both the first stop surface 98 and the second stop surface 102 when the second lock member 46 is in the locked position (FIGS. 4 and 7). The protuberance 94 of the first lock member 42 does not extend inside the groove 90 when the second lock member 46 is in the unlocked position. The interaction between the protuberance 94 and the stop surfaces 98, 102 when the protuberance 94 is inside the groove 90 prevents rotation of the head restraint 30 relative to the base portion 14. The first stop surface 98 and the second stop surface 102 are substantially parallel to one another.

The protuberance 94 of the first lock member 42 includes a first surface 106 and a second surface 108 that are parallel to one another. The first surface 106 contacts the first stop surface 98 when the second lock member 46 is in the locked position, and the second surface 108 contacts the second stop surface 102 when the second lock member 46 is in the locked position.

The first stop surface 98 is a circle segment, i.e., an arc of a circle 110 having a first center point 114. The second stop surface 102 is a circle segment, i.e., an arc of a circle 118 having a second center point 122. The axis A2 and the first center point 114 form an angle 126 that is between about 3 and about 5 degrees. That is, if a first line 130 is drawn from a point on the first stop surface 98 to the axis A2, and a second line 132 is drawn from the point on the first stop surface 98 to the first center point 114, the first and second lines 130, 132 will form an angle 126 therebetween that is between about 3 and about 5 degrees. In the embodiment depicted, the angle 126 is 3.829 degrees.

The axis A2 and the second center point 122 form an angle 136 that is between about 3 and about 5 degrees. That is, if a first line 140 is drawn from a point on the second stop surface 102 to the axis A2, and a second line 142 is drawn from the point on the second stop surface 102 to the second center point 122, the first and second lines 140, 142 will form an angle 136 therebetween that is between about 3 and about 5 degrees. In the embodiment depicted, the angle 136 is 3.908 degrees.

Referring to FIGS. 1, 4, 5 and 7, insulating members 143 separate the coil 54 from other components, including the core 58. The rod 49, which is mounted to the frame 34, supports the insulating members 143 and the coil 54 via brackets 144. A torsion spring 148 is coiled around the rod 49, and operatively interconnects the second lock member 46 and the frame 34 such that the spring 148 biases the second lock member 46 toward its locked position. Other torsion springs 152 operatively interconnect the frame 34 and the base portion 14 such that the torsion springs 152 bias the head restraint 30 toward its folded position.

Accordingly, when the head restraint 30 is in the upright position and the electromagnet 50 is not energized, as shown in FIG. 4, the spring 148 maintains the second lock member 46 in the locked position, and the head restraint 30 is not rotatable about axis A1 because of the interaction between the surfaces of the protuberance 94 and the groove 90. When a vehicle user desires the head restraint 30 to move to the folded position (FIG. 6), the user may cause electrical current to flow through the coil 54, which creates a magnetic field and thereby causes the second lock member 46 to overcome the bias of spring 148 and rotate about axis A2 to the unlocked position (FIG. 5). With the protuberance 94 outside of the groove 90, there is nothing to prevent the rotation of the head restraint 30 about axis A1, and the springs 152 cause the head restraint 30 to rotate about axis A1 to the folded position.

When a vehicle user desires to move the head restraint 30 from the folded position back to the upright position, the user may manually rotate the head restraint 30 back to the upright position; with the electromagnet not energized, the spring 148 will automatically move the second lock member 42 to the locked position so that the head restraint 30 will remain in the upright position.

The coil 54 is in electrical communication with a source of electrical energy, such as the vehicle's battery, via wires that extend from the coil 54, through one or both post members 18, and through the seat back portion of the vehicle seat. A switch to control current flow from the battery to the coil 54 may be manually operated by the vehicle user, or may, for example, be controllable remotely such as via a wireless key fob. Additionally, the coil 54 may be controlled via voice commands enabled with an audible detection system configured to receive a voice command from the user to activate the electromagnet into the energized condition. Furthermore, the coil 54 may be configured to detect whether an occupant is seated in the seat that the head restraint 30 is connected to. This is accomplished with one or more sensors in the seat and/or seatback. In the event the seat is empty, the coil 54 may be energized to release the latch that controls the position of the head restraint 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A head restraint assembly comprising:
   a base portion mountable to a vehicle seat;
   a head restraint operatively coupled to the base portion and selectively rotatable with respect to the base portion about a first axis for movement between an upright position and a folded position;
   a locking mechanism including a first lock member mounted with respect to the base portion and a second lock member rotatably mounted with respect to the head restraint for movement between a locked position and an unlocked position, wherein the locked position comprises engagement of the first lock member with the second lock member to prevent rotation of the head restraint relative to the base portion, and wherein the unlocked position comprises disengagement of the first lock member from the second lock member to allow rotation of the head restraint relative to the base portion; and
   an electromagnet operatively connected to the head restraint and positioned to exert a magnetic force on the second lock member that urges the second lock member toward the unlocked position when the electromagnet is in an energized condition.

2. The head restraint assembly of claim 1, further comprising a first spring that biases the second lock member toward the locked position.

3. The head restraint assembly of claim 1, wherein the electromagnet includes a wire coil around a ferromagnetic core.

4. The head restraint assembly of claim 3, wherein the core is generally U-shaped.

5. The head restraint assembly of claim 4, wherein the core includes a first segment extending through the coil and having opposite ends, and wherein the core includes second and third segments extending from a respective one of the ends of the first segment toward the second lock member.

6. The head restraint assembly of claim 5, wherein the second lock member is selectively rotatable about a second axis between the locked and unlocked positions.

7. The head restraint assembly of claim 6, wherein the second lock member includes first and second protuberances that align with the second and third segments of the core when the second lock member is in the unlocked position.

8. The head restraint assembly of claim 5, further comprising:
   a groove defined by the second lock member;
   a protuberance defined by the first lock member;
   a first stop surface and a second stop surface disposed within the groove;
   wherein the protuberance of the first member is inside the groove and simultaneously contacts both the first stop surface and the second stop surface when the second lock member is in the locked position; and
   wherein the protuberance of the first member is externally located relative to the groove when the second lock member is in the unlocked position.

9. The head restraint assembly of claim 8, wherein the protuberance of the first lock member includes a first surface and a second surface, the first surface and the second surface located substantially parallel to each another.

10. The head restraint assembly of claim 9, wherein the first stop surface is an arc having a first center, and wherein the second stop surface is an arc having a second center.

11. The head restraint assembly of claim 10, wherein the first center is angularly displaced from the second axis by between about 3 degrees and about 5 degrees, and wherein the second center is angularly displaced from the second axis by between about 3 degrees and about 5 degrees.

12. The head restraint assembly of claim 1, wherein the head restraint includes a plastic frame that defines a cavity in which the first and second lock members, the coil, and the core are disposed.

13. The head restraint assembly of claim 1, wherein the electromagnet is hardwired to an electrical source.

14. The head restraint assembly of claim 1, wherein the electromagnet is manually activated into the energized condition by a user.

15. The head restraint assembly of claim 14, further comprising a vehicle switch configured to activate the electromagnet into the energized condition.

16. The head restraint assembly of claim 14, further comprising an audible detection system configured to receive a voice command from the user to activate the electromagnet into the energized condition.

17. The head restraint assembly of claim 1, wherein the electromagnet is in operative communication with a sensor disposed in the vehicle seat, the sensor configured to determine whether an occupant is in the vehicle seat, the electromagnet configured to be activated into the energized condition upon detecting that the vehicle seat does not have an occupant seated thereon.

18. A locking mechanism disposed within an interior portion of a head restraint comprising:
   a first lock member mounted within the head restraint;
   a second lock member mounted within the head restraint and rotatable about an axis between a locked position and an unlocked position, wherein the locked position comprises engagement of the first lock member with the second lock member to prevent rotation of the head restraint relative to the base portion, and wherein the unlocked position comprises disengagement of the first lock member from the second lock member to allow rotation of the head restraint relative to the base portion;
   a groove defined by the second lock member;
   a protuberance defined by the first lock member;
   a first stop surface and a second stop surface disposed within the groove, wherein the protuberance of the first member is inside the groove and simultaneously contacts both the first stop surface and the second stop surface when the second lock member is in the locked position, wherein the protuberance of the first member is externally located relative to the groove when the second lock member is in the unlocked position; and
   an electromagnet mounted within the head restraint and positioned to exert a magnetic force on the second lock member that urges the second lock member toward the unlocked position when the electromagnet is in an energized condition, wherein the second lock member includes first and second protuberances that align with respective segments of the electromagnet when the second lock member is in the unlocked position.

19. The locking mechanism of claim 18, wherein the electromagnet is hardwired to an electrical source.

20. The head restraint assembly of claim 18, wherein the electromagnet is manually activated into the energized condition by a user.

* * * * *